No. 770,910. Patented September 27, 1904.

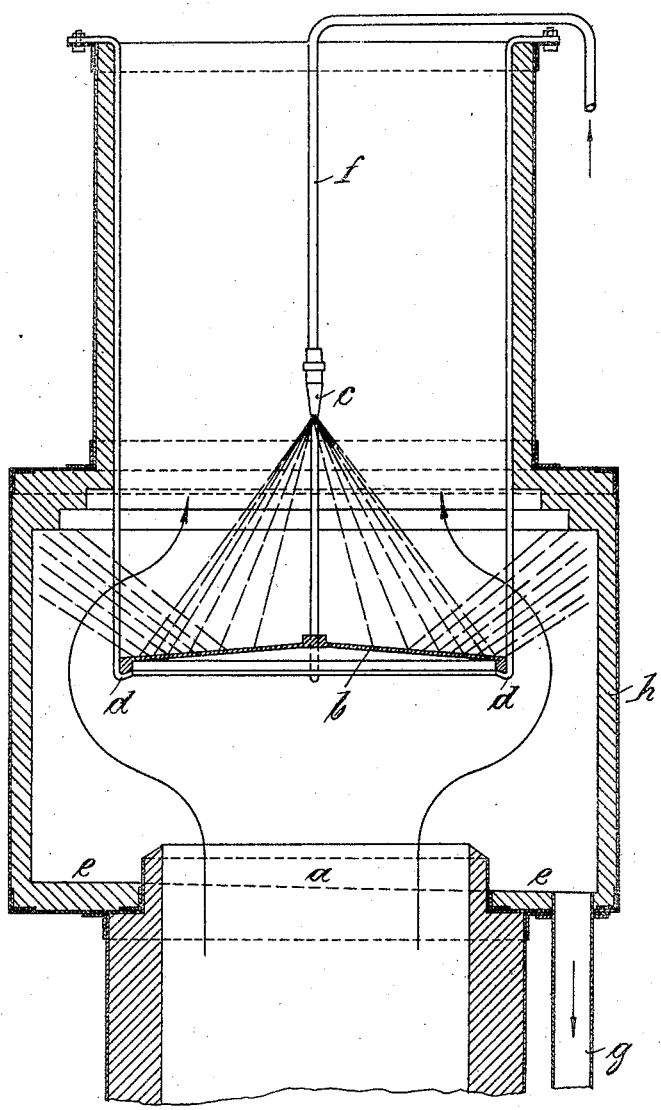

UNITED STATES PATENT OFFICE.

LUDWIG KEYLING, OF BERLIN, GERMANY.

COOLING DEVICE FOR BLAST-FURNACES.

SPECIFICATION forming part of Letters Patent No. 770,910, dated September 27, 1904.

Application filed August 6, 1902. Serial No. 118,651. (No model.)

*To all whom it may concern:*

Be it known that I, LUDWIG KEYLING, a subject of the King of Prussia, German Emperor, and a resident of 129 Ackerstrasse, Berlin, Kingdom of Prussia, German Empire, have invented certain new and useful Improvements in Cooling Devices for Blast-Furnaces, of which the following is an exact specification.

My invention relates to improvements in cooling devices for blast-furnaces, and more especially to a device for cooling the top gases, extinguishing the top flame and sparks, and keeping the ashes back. I attain this purpose by the device illustrated in the accompanying drawing, in which a vertical section of the top part of a furnace provided with my new device is shown.

In the drawing, $a$ is the top of the furnace. $b$ is a plate situated above the upper opening of the furnace, the diameter of which plate is larger than the diameter of the opening. $c$ is a water nozzle or douche situated above the plate $b$. $f$ is a water-pipe for leading the water to the nozzle $c$. $d$ represents bars for holding the plate $b$ in its position. $e$ is an annular channel situated around the upper part of the furnace, and $g$ is a pipe leading from the channel $e$ to the outside.

The effect of the apparatus is as follows: The water-jets leaving the nozzle $c$ stream upon the plate $b$, are rebounded from this plate, and thrown against the walls of the chamber $h$. These water-jets are partly rebounded again from these walls, whereby a closed water mantle is formed through which the gases leaving the furnace $a$ must pass in the direction of the arrows shown in the drawing. In consequence hereof the top flame and sparks are extinguished, the ashes carried along by the top flame are kept back, and the top gases are cooled. In consequence of the diameter of the plate $b$ being larger than the diameter of the upper opening of the furnace the water dropping down from the plate $b$ cannot get into the furnace, but drops into the channel $e$, from which channel this water, together with the ashes gathering in this channel, is led off through the pipe $g$. In consequence of the plate $b$ being always cooled a burning of this plate is entirely avoided. The sulfurous gases contained in the top gases are absorbed by the water, so that a bad effect of the same cannot take place, which is very important for the workmen attending the furnace and effecting the charging of the same, especially in view of the device working continuously and it not being necessary to stop the working of the device during the charging of the furnace.

Having thus fully described the nature of this invention, what I desire to secure by Letters Patent of the United States is—

In a cooling device for blast-furnaces, the combination of a box in which the upper opening of the furnace is situated, a plate situated in this box vertically above the upper opening of the furnace, the diameter of this plate being larger than the upper opening of the furnace, so that the edge of this plate projects sidewise over the opening of the furnace, a water-nozzle situated vertically above the plate, an annular channel situated around the top part of the furnace in the box and means for connecting this channel with the outside, substantially as described and for the purpose set forth.

In testimony whereof I have signed my name to this specification in the presence of two subscribing witnesses.

LUDWIG KEYLING.

Witnesses:
 WOLDEMAR HAUPT,
 WILLIAM MAYNER.